United States Patent Office 3,654,371
Patented Apr. 4, 1972

3,654,371
PROCESS FOR THE MANUFACTURE OF CYCLODEC-5-EN-1-ONE
Albert Schnider, Domat-Ems, Grisons, and Werner Hurschler, Chur Grisons, Switzerland, assignors to Inventa A.G. fur Forschung und Patentverwertung, Zurich, Switzerland
No Drawing. Filed Sept. 6, 1967, Ser. No. 665,744
Claims priority, application Switzerland, Sept. 8, 1966, 12,969/66
Int. Cl. C07c 49/44
U.S. Cl. 260—586 A                    6 Claims

ABSTRACT OF THE DISCLOSURE

A process for the dehydration of cyclodecanol-(6)-one(1) to cyclodec-5-en-1-one. The dehydration is carried out with a catalyst system consisting of gaseous ammonia and a special, activated calcium sulfate.

---

The invention relates to an improved process for the manufacture of cyclodec-5-en-1-one from cyclodecanol-(6)-one(1). It is an important material in the manufacture of nylon-10. Dehydration of cyclodecanol-(6)-one(1) with conventional dehydrating agents has been found to lead to either no result or at best to very small yields.

A process is known for the manufacture of cyclodec-5-en-1-one by heating cyclodecanol-(6)-one(1) in the presence of platinum, zinc, iron, their oxides or basic metal salts, metal salt mixtures or calcium sulfate. The yields obtained with these catalysts are not only small, but byproducts form, due to the tendency of the cyclodecane ring toward formation of bicyclic derivatives. These byproducts cannot be reconverted into oxyketone and hence, in continuous processes, cannot be recycled into the reaction.

Surprisingly, it now has been found that cyclodecanol-(6)-one(1) can be hydrated in the gas phase with the use of a particularly active form of calcium sulfate in the presence of ammonia, preferably at temperatures of approximately 280–300° C. The end product is obtained in good yield, and 1,6-oxidocyclodecene-1 forms as byproduct which readily can be rehydrated to the starting product in a known manner, so that it can be used again. Only very slight quantities of hydronaphthalenes form, and these can be reconverted into oxyketone. Undesirable byproducts, such as bicyclic derivatives do not form in this reaction.

The particularly suited catalyst for the commercial-scale dehydration of cyclodecanol-(6)-one(1) in the gas phase consists of a definite modification of calcium sulfate as the fundamental catalyst, together with a small percentage of gaseous ammonia. The latter probably does not act as ammonia itself, but more likely indirectly in the form of 11-azabicyclo-(4,4,1)-undecene-1, formed with the starting product. The actual effect of the catalyst is believed to rest on a calcium sulfate-azabicycloundecene adduct.

The elemental catalyst is activated calcium sulfate in the form of beta-anhydrite III. It is derived from natural gypsum types of greatest possible purity, e.g., alabaster. Gypsum which contains dolomite is less suitable, but can be used.

Granulated alabaster is dehydrated in an air stream of approximately 200° C. first to the beta-semihydrate, and then at 230–250° C. to beta-anhydrite III. The manner of drying is important for the production of the catalyst. It is essential that the beta-semihydrate does not contain too much alpha-semihydrate. The latter loses its water of crystallization at about 170° C., converts to insoluble alpha-anhydrite II at temperatures as low as 220° C. and thus loses its effectiveness, while the conversion of anhydrite III into the inactive form II occurs only beyond a temperature of 350° C. in the instance of the alpha-semihydrate (R. Pièce, Bulletin Suisse de Minéralogie et Pétrographie, vol. 41/2 (1961)). An activated calcium sulfate in the form of "soluble" anhydrite III, consisting predominantly of beta-anhydrite III, is commercially available under the name "Sikkon" (Swiss reg. trademark registered by "Fluka" A. G., Chemical Works, Buchs/SG, Switzerland). However, its dehydrating properties are not always uniform and may vary greatly.

Beside the crystallographic characteristics of the catalyst, its acidity or basicity, respectively, are of decisive importance. Acidic additives greatly increase the formation of undesirable bicyclic derivatives, whereas certain basic components, such as calcium hydroxide or ammonia remarkably favor the formation of cyclodec-5-en-1-one. For instance, Sikkon, treated with calcium hydroxide solution and then dried, yields as much as 60–65% unsaturated ketone, and this can even be further increased by addition of ammonia.

The ammonia can be introduced, e.g., by means of a carrier gas, such as nitrogen, at atmospheric pressure. Ammonia contents of less than 0.1 weight percent have little effect, those above 2 weight percent (calculated on the oxyketone throughput) are neither required nor useful for the increase of the cyclodecenone yield. The yield is slightly higher in vacuo than using nitrogen as carrier gas at normal pressures; however, in the vacuum, the conversion decreases faster relative to time.

Oxyketone treated shortly with gaseous ammonia gives a good yield of cyclodecenone with the calcium sulfate catalyst according to the invention, apparently due to the formation of 11-azabicyclo-(4,4,1)-undecene-1. Correspondingly dehydrated dolomite-containing natural gypsum types also lead to an increased cyclodecenone yield with added $NH_3$ than without additive. In contradistinction, addition of ammonia to other catalysts, e.g., common calcium sulfate, asbestos or others, has absolutely no effect on the cyclodecenone formation. Similar negative effects can be observed upon addition of pyridine, hydrazine, $CO_2$ or $SO_2$. Lower cyclodecenone yields coincide proportionally with rising oxidocyclodecene yields.

Yields obtainable with the calcium sulfate catalyst alone are 40–45% cyclodec-5-en-1-one, with addition of calcium hydroxide 65%, and with ammonia 80–90%.

A continuous decrease in the oxyketone reaction has been observed in the course of time. However, the dehydrating capacity of the catalyst begins to rise again after stopping of the ammonia supply, while the cyclodecenone reverts to approximately 60% only slowly. It is therefore feasible to start the dehydration of the oxyketone at an ammonia concentration of approximately 1 volume percent (calculated on $N_2$) at optimal throughput and then to let the throughput decline to a tolerable minimum corresponding to the reduction of the dehydration capacity. Subsequently, the ammonia supply is stopped entirely or kept constant at a minimal concentration of approximately 1 volume percent. It is possible to dehydrate approximately 20 times the quantity of oxyketone with the calcium sulfate catalyst alone with satisfactory yields, however, thereafter the reaction decreases abruptly. The decrease in activity is less strong with ammonia addition and occurs continuously. The reason for the loss in activity is the above-mentioned crystallographic conversion of the soluble anhydrite III into insoluble anhydrite II. In view of the comparatively high temperatures employed, this conversion takes place slowly.

When more than 1 volume percent ammonia (calculated on the oxyketone) are employed, the secondary base 11-azabicyclo-(4,4,1)-undecene-1 can be identified in the mixture of dehydration products. The content thereof rises with the NH₃ concentration. A Cope, J. Cotter and G. Roller, JACS 77, 3590–4 (1955) name as boiling point of this compound a temperature of 79–81° C. at 3 mm. Hg. They obtain this material as byproduct in the hydration of 6-hydroxycyclodecanone oxime. However, the base can be obtained as the main product by introducing gaseous ammonia into liquid cyclodecanolone-1,6 of a boiling point of 107° C./12 mm. Hg at 150° C. In moist air or by addition of water, a well crystallized white hydrate forms.

When the elemental catalyst is pretreated with gaseous 11-azabicyclo-(4,4,1)-undecene-1, the yield on cyclodecenone upon dehydration of cyclodecanol-(6)-one(1) unexpectedly approximately doubles, whereas a pretreatment of the activated calcium sulfate with NH₃ promotes the formation of 1,6-oxidocyclodecene-1.

Refining of the cyclodec-5-en-1-one and its isolation are carried out in the conventional manner.

The invention now will be more fully explained by the following examples. However, it should be understood that these are given merely by way of illustration, and not of limitation, and that it is intended to cover all variations and modifications which do not constitute departures from the spirit and the scope of the invention as hereinafter claimed.

The temperatures in these examples are degrees centigrade. Percentages are by weight unless otherwise specified.

EXAMPLE 1

500 g. cyclodecanol-(6)-one(1) in a vessel at 200° C. and atmospheric pressure were vaporized by a stream of nitrogen (the vapor pressure of the oxyketone at this temperature is approximately 55 mm. Hg).

The gas mixture containing 0.5% NH₃ (calculated on the oxyketone) was carried through a preheat zone and then into a glass tube containing the dehydration catalyst, 165 ml. contact substance, predominantly beta-anhydrite III, at a temperature of 290°.

The composition of the condensed product was determined gas chromatographically and, in area percent at a catalyst load of 0.66 part oxyketone per 1 part catalyst per hour, after separation of 17% unconverted oxyketone, was:

| | Percent |
|---|---|
| Hydronaphthalenes | 6 |
| 1,6-oxidocyclodecene-1 | 31.5 |
| Cyclodec-5-ene-1-one | 62.5 |

EXAMPLE 2

5 ml. cyclodecanol-(6)-one(1) were distilled from a flask at a vacuum of 12 torr through a glass tube, loaded with 120 g. "soluble" anhydrite and electrically heated to 280°. The oxyketone throughput was 2 g. per minute, ammonia throughput 0.25 l./h. (liters per hour).

At a conversion of 60%, the following components were found by gas chromatographic analysis:

| | Percent |
|---|---|
| 1,6-oxidocyclodecene-1 | 13 |
| Cyclodec-5-ene-1-one | 87 |

EXAMPLE 3

Through a glass tube of 2 cm. diameter, disposed in an electric oven at 300°, and containing 100 g. beta-anhydrite III, vaporized oxyketone was conducted at 15 torr at a throughput of 0.5 ml. per minute in the presence of 11-azabicyclo-(4,4,1-undecene-1. The quantity of the secondary base (B.P. 107°/12 torr. was approximately 5% of the oxyketone.

The content on cyclodec-5-en-1-one was approximately 70%, while a yield of only approximately 35% was obtained without the secondary base. The remainder consisted almost exclusively of 1,6-oxidocyclodecene-1.

EXAMPLE 4

Cyclodecanol-(6)-one(1) was dehydrated at 25 torr with Sikkon and NH₃ in an amount of 1% (calculated on the oxyketone throughput). The temperature was 300°, the load 0.55 part oxyketone per part catalyst per hour.

The results obtained are shown in Table 1.

TABLE 1

| Time, hr. | Conversion, percent | Percent of Conversion Cyclodecenone | Percent of Conversion Oxydocyclodecene | Cyclodecenone, percent of throughput |
|---|---|---|---|---|
| 0.5 | 68 | 65 | 25 | 42 |
| 1 | 57 | 68 | 25 | 35 |
| 1.5 | 47 | 72 | 25 | 30 |
| 2 | 40 | 75 | 25 | 25 |
| 2.5 | 32 | 76 | 25 | 20 |
| 3 | 25 | 78 | 25 | 18 |
| 3.5 | 20 | 78 | 25 | 15 |
| 4 | 15 | 79 | 25 | 15 |

The cyclodec-5-en-1-one had a boiling point of 100–103° at mm. Hg (literature: 81.5–84°/4.4–5 mm. Hg).

Hydrogenation using Pd on activated carbon (10%) yielded cyclodecanone having a B.P. of 108° and an M.P. of 18°.

We claim as our invention:

1. A process for the manufacture of cyclodec-5-en-1-one which comprises dehydrating the oxyketone cyclodecanol-(6)-one(1) at temperatures of substantially 280–300° C. using beta-anhydrite III as a catalyst and in the presence of 0.1 to 2 weight percent gaseous ammonia, calculated on the oxyketone throughput.

2. The process as defined in claim 1, wherein dehydration is carried out at pressures ranging from atmospheric to substantially 25 torr.

3. The process as defined in claim 1, wherein said catalyst is rendered basic by pretreatment with calcium hydroxide.

4. The process as defined in claim 1, wherein said ammonia is replaced by up to 5 weight percent 11 azabicyclo-(4,4,1)-undecene-1, calculated on the oxyketone throughput.

5. The process as defined in claim 1, wherein ammonia is introduced in nitrogen as a carrier gas, and the dehydration carried out at atmospheric pressure.

6. The process as defined in claim 5, wherein ammonia is present in said carrier gas at 1 volume percent.

References Cited

UNITED STATES PATENTS 3,254,127   5/1968   Schnider _____ 260—586 A

LEON ZITVER, Primary Examiner

N. MORGENSTERN, Assistant Examiner

U.S. Cl. X.R.

260—239 B, 333, 666 PY